June 3, 1952  F. C. SCHWANEKE  2,599,070
FOOD MIXER
Filed April 11, 1950 2 SHEETS—SHEET 1
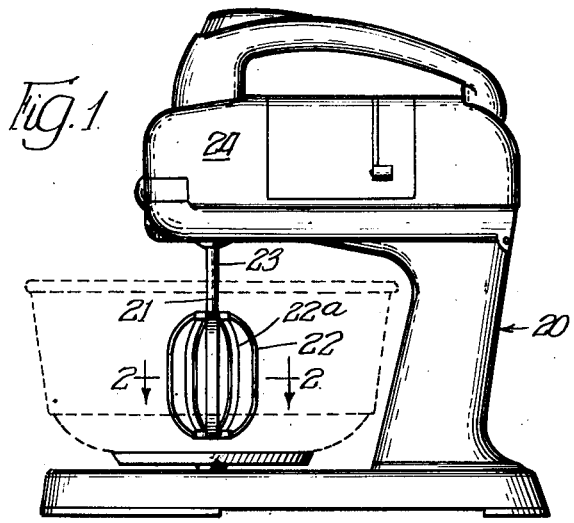
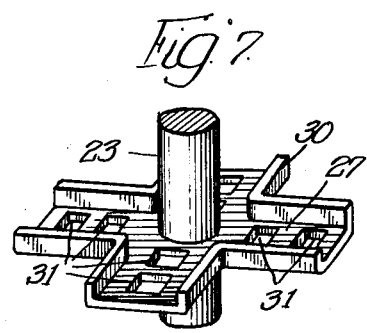
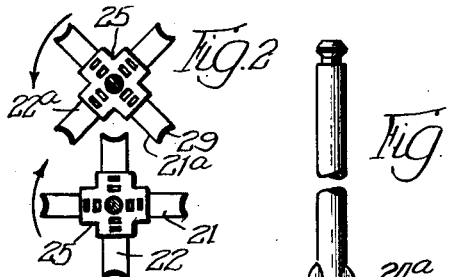
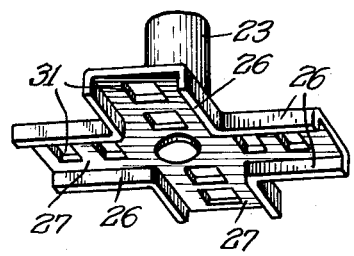
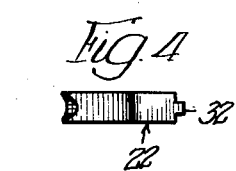
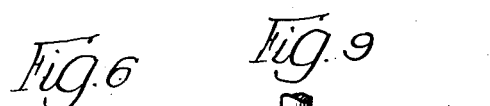
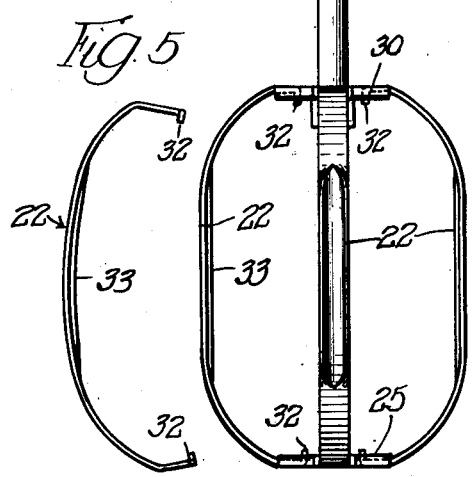
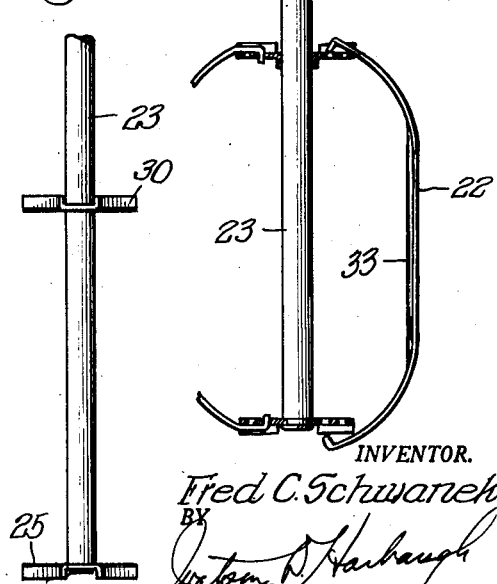
INVENTOR.
Fred C. Schwaneke, June 3, 1952 — F. C. SCHWANEKE — 2,599,070
FOOD MIXER
Filed April 11, 1950 — 2 SHEETS—SHEET 2
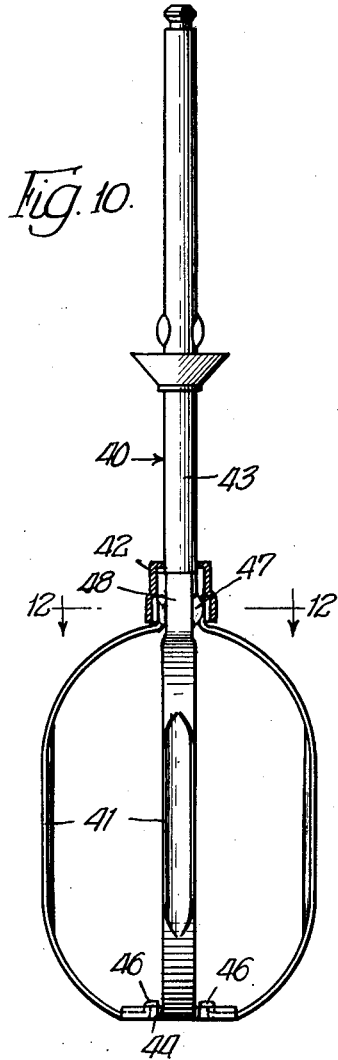
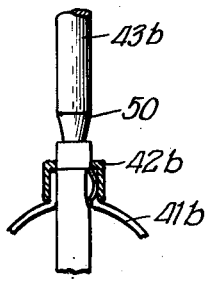
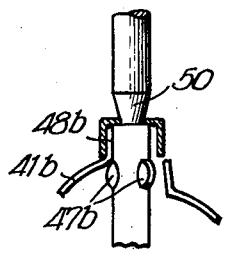
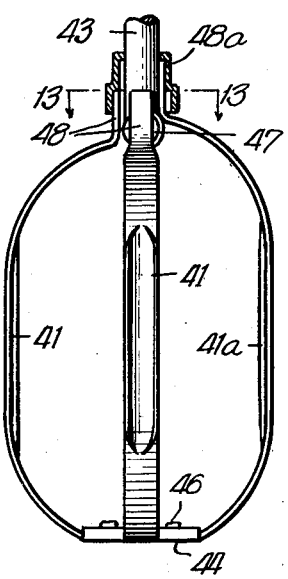
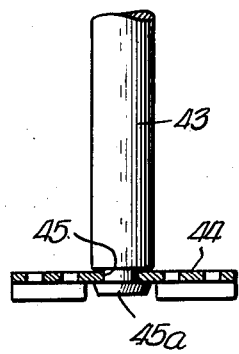
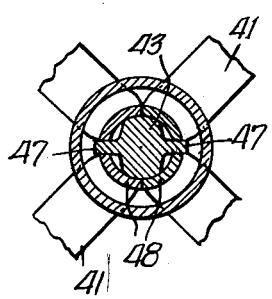
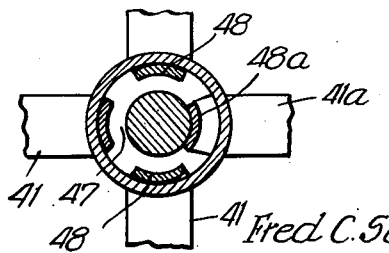
INVENTOR.
Fred C. Schwaneke Patented June 3, 1952

2,599,070

UNITED STATES PATENT OFFICE 2,599,070

FOOD MIXER

Fred C. Schwaneke, Chicago, Ill., assignor to Dormeyer Corporation, Chicago, Ill., a corporation of Illinois Application April 11, 1950, Serial No. 155,167

20 Claims. (Cl. 259—133)

This invention relates generally to food mixers and more particularly to an improved beater or stirrer which is especially adapted for use in electric motor driven food mixers having two or more rotary interdigitating beaters.

Electric motor driven household food mixers have come into very wide use in the past two decades. Most of these mixers comprise a stand supporting a mixing bowl, a motor which overhangs the bowl, and a pair of beaters which depend from the motor into the bowl. In most mixers each beater is a ring type beater, being provided with four radially extending looped blade elements which are spaced ninety degrees apart and secured at top and bottom to a central shaft. The shafts of the two beaters are usually parallel and spaced such distance apart that the blade elements overlap and interdigitate as the shafts are rotated in opposite directions at the same speed.

During recent years there has been a trend to increase the power of the motors employed in household food mixers in order to provide better speed control, quicker mixing, and also additional power to drive comparatively heavy duty accessory attachments. As a result of this power increase, however, the torque available at the beaters has been greatly increased to the point where the motor will not stall if an object such as a spatula, spoon, or a person's finger accidentally becomes caught in the beaters.

Although the possibility of an operator catching his finger in the beaters is rather remote, such would be a painful injury, and probably result in the amputation of the finger. On the other hand, it is quite simple for an operator to be careless and allow an implement such as a spatula to become caught in the rotating beaters. When this occurs, the usual result is that the beater blades are bent out of shape or fractured, and the article caught is extensively damaged.

Accordingly, one object of this invention is to provide a beater structure which will not be damaged in the event an object becomes caught in the beater blades, and the gearing driving the beater as well as the entangled object will not be damaged.

Another object is to provide a beater having individual blades which are readily removable for cleaning, the blades being firmly seated, however, so as to deliver full torque without bending during all normal mixing operations.

Another object is to provide a household food mixer beater construction wherein all of the blades of a beater are uncoupled from drive relationship the instant any one of the blades strikes an object solid enough to deflect the blade appreciably.

A further object is to provide a simple compact construction having a minimum of food catching cracks or corners so as to be easy to keep in a clean, sanitary condition with or without disassembly of the blades, and, a beater construction which is inexpensive and simple to fabricate.

A further object is to provide a beater having readily removable blades which may serve as a drink mixer agitator when the blades have been removed.

A further object is to provide an arrangement whereby single blades may be removed and replaced at will in the event they become damaged in handling.

A further object is to provide an arrangement whereby the degree of overlapping or interdigitation of blades may be varied at will to vary the amount of cavitation and resultant aeration of the mix either by readily adjusting the beater or by removing certain blades to accomplish ideal mixing or beating characteristics for substances operated upon.

Other objects and advantages of this invention will of course present themselves to those familiar with the art on reading the following specification in conjunction with the drawings and the appended claims:

In the drawings:

Fig. 1 is a side view of a household food mixer equipped with the beaters of this invention;

Fig. 2 is a horizontal section taken on line 2—2 of Fig. 1 showing the relative positions of the beaters;

Fig. 3 is an enlarged side view of a preferred form of beater;

Fig. 4 is a top view of a beater blade when detached from the beater;

Fig. 5 is a side view of the detached blade;

Fig. 6 is a view of the beater shaft with the blades removed;

Fig. 7 is an enlarged perspective view showing the upper blade supporting bracket;

Fig. 8 is an enlarged perspective view showing the lower blade supporting bracket;

Fig. 9 is a view showing the beater with one blade bent inwardly to the shape it assumes when an object is caught in the beaters or it is pressed inwardly to release it for removal;

Fig. 10 is a side view, partially in section, of a modified form of beater;

Fig. 11 is a view similar to Fig. 10 but showing the elements in the positions they occupy when an object is encountered by the rotating blades;

Fig. 12 is a horizontal section taken on line 12—12 of Fig. 10;

Fig. 13 is a horizontal section taken on line 13—13 of Fig. 11;

Fig. 14 is an enlarged view, partially in section, showing the lower beater bracket;

Fig. 15 is a side view, partially in section, showing another modification; and

Fig. 16 is a view similar to Fig. 15 but showing the elements in the release position.

A fundamental principle of applicant's invention is to provide egg beater type agitators with individually acting arcuate blade elements which are releasably attached at their ends to the beater shaft in such fashion that they are detached from driving relationship when they are pressed inwardly toward the beater shaft as when a solid object becomes entangled in the beaters of a mixer. Moreover, the blades can be removed at will for cleaning or to have the blade support elements function as drink mixers.

A household food mixer 20 provided with a pair of agitators 21 constructed according to this invention is shown in Fig. 1. Only one of the two beaters 21 is fully visible in Fig. 1 for the other beater is disposed directly behind the first when viewed from the side. The blades 22a of the other beater, however, may be seen in this view. Fig. 2, which is a horizontal section, shows the relationship between the two beaters and the manner in which the blades 22 overlap or interdigitate as the beaters rotate in opposite directions.

In the mixer 20 shown, the heater shafts 23 are removably supported in drive spindles (not shown) within the power unit 24. Each shaft has a pair of ears 24a (Fig. 3) which engage slots provided in the spindles to key the beaters 23 to the spindles. The present invention, however, is concerned primarily with beater structure rather than the method of driving or supporting the beaters.

At the bottom of each beater shaft 23 a cruciform holder or bracket 25 is provided which comprises a piece of metal cut to the form of a cross and having its edges 26 bent downwardly to form four channel portions 27. The brackets are preferably formed by stamping them from sheet metal.

To secure the bracket to the beater shaft 23, the end of the shaft is preferably undercut to have a square cross section and is slipped through a square hole at the center of the bracket 25. The projecting end is then peened to lock the bracket 25 to the shaft 23.

A similar bracket 30 is provided for supporting the upper ends of the beater blades 22. The bracket 30 is identical with the bottom bracket 25 except that it is adapted to be brazed to the shaft 23 instead of secured by peening. The upper bracket 30 is mounted on the shaft 23 so that the channels 27 face upwardly instead of downwardly.

To support the blades, each channel portion 27 is provided with a pair of rectangular openings 31 which receive projecting lugs 32 provided at the ends of the blades 22. If desired, a single lug receiving opening 31 in each channel 27 is all that is required, but it has been found desirable to provide additional openings to provide two positions in which the blades 22 may be installed. When mixing heavy substances such as thick batters, etc., it is preferable to support the ends of the blades in the innermost openings 31 to strengthen the arrangement and reduce the effective width of the beaters. This produces more of a stirring action than a whipping or beating action and reduces the torque load on the beaters somewhat. Furthermore, the blades are more solidly supported when in this position than when supported in the outer openings 31.

When mixing lighter substances or when whipping cream or eggs it is preferred to support the ends of the blades 22 in the outermost holes 31 to increase the degree of blade overlap or interdigitation. This causes more cavitation and aeration of the mix and increases the speed of mixing, for the blades 22 travel at higher velocities when located farther from the shaft 23.

When the blades are removed, the brackets and the holes therethrough serve as cutting and comminuting elements for preparation of drinks or the like.

The blades 22 are constructed of spring steel bent to have the shape shown in Figs. 4 and 5 when unstressed. To provide additional strength and a wider cross sectional surface, the blades are preferably formed with ribs 33 which extend the length of the straight side portions. The lugs 32 are bent inwardly at right angles to the adjacent portions of the blade 22 so as to pass straight through the openings 31 when the blades are mounted on the brackets 25 and 30. The preferred method of forming the blades is to stamp them from annealed spring steel and then to harden the steel by heating and quenching to give it the desired resilience.

To install the blades 22 on the beater shaft 21, one end of the blade is inserted into one of the channels 27 with the lug 32 projecting through one of the openings 31. The other end of the blade is then pulled outwardly and slipped into the corresponding channel 27 of the other bracket, the lug 32 being received in the corresponding opening 31. Once installed, the blade 22 is firmly supported, the edges of the channels 27 giving lateral support and holding the blade in a true radial position even against high mixing reaction forces. When installed, the blades 22 assume the shape shown in Fig. 3. Furthermore, the sides of the blades 22 are transversely curved as at 29 with the concavity thereof outwardly so that the leading edges, either direction they turn, not only tend to dig outwardly into the mixture operated upon to assist in maintaining the supported relationship on the brackets, but also serve to give a greater aerating and mixing effect than possible with merely flat blades.

The manner in which the blades 22 are released when pressed inwardly toward the beater shaft is shown in Fig. 9. As the side of the blade 22 is pressed inwardly from the normal straight line position, either or both ends are moved axially out of the respective brackets or channels with which such are engaged, and if the beater is near the bottom of a bowl the upper lug 32 is lifted out of the hole 31 to release that end of the blade 22 at the same time or after which the lower end is released.

Thus the instant an object becomes caught between the rotating beaters, particularly in the zone of interdigitation, the blades 22 which it encounters are pressed inwardly and fall free of the brackets to the bottom of the bowl and are pushed to one side by the brackets without suffering any damage and without injuring the object. The action of the blades 22 in this respect is substantially identical regardless of which set of holes 31 in which the lugs are supported.

To remove the blades 22 from the beater 21, all the operator has to do is to press inwardly on the middle of the blade to lift the lugs 32 out of the holes 31 and twist the blade 22 sidewise slightly to move the ends onto the sides of the channels 27 with which movement the lugs 32 are drawn out of alignment with the previously engaged holes 31 and pass over any second group of holes as they are pulled free of the brackets 25 and 30. The sides of the channels serve as locating elements so that the blades need not be strained if otherwise there might be a manual tendency to clear one end and not the other because of over-movement at the cleared end. Furthermore, the sides of the channels on the brackets make it easy to slide the ends of the blades past the outermost group of openings to the innermost openings with the greatest of ease and least trouble. Of course, if desired, one end of the blade 22 may be lifted endwise and outwardly to free its lug 32, after which the other end may be released by repeating the movement in the opposite direction at the other end of the blade. With this latter method, reverse movement of the blade may be made for attachment purposes.

From the foregoing it will be apparent that a superior beater has been provided which has blades that are virtually immune from damage due to the entanglement of objects in the rotating beaters. As a practical matter it is almost impossible to catch an object in the beaters at any other place than between the two beaters in the zone of interdigitation. If an object is to be caught otherwise than in this manner it must be passed endwise through the space between a blade and the beater shaft. With the beaters whirling at high speed this is practically impossible to do, for the object must be moved into the aforesaid space within the small increment of time which is required for a quarter revolution of a beater. If the object is not moved all the way into the space during this time, the beater blade will knock it away instead of catching it.

Another modification of this invention is shown in Figs. 10 to 14 of the drawings. The modified form of beater 40 is somewhat different in appearance, but it functions in the same manner to prevent damage to the blades 41 when an object forces them inwardly as does the preferred embodiment. Instead of being released to fly free, however, all of the blades 41 are simply released from drive relationship at the top when one blade is deflected inwardly. In this embodiment the upper ends of the blades are held in driven position by a collar 42 supported on the beater shaft 43.

At the bottom of the shaft 43 a bracket 44 is provided which is substantially identical with the bracket 25 in the preferred embodiment. This bracket, however, is journalled for free rotation with respect to the shaft 43 instead of being fixed thereto. As shown in Fig. 14, the end of the shaft 43 is undercut to have a smaller diameter. The bracket 44 is provided with a round hole 45 which slips loosely on the undercut portion, and the end of that portion is peened over to form a retaining head 45a.

The lower ends of the beater blades 41 are substantially identical with those of the preferred embodiment except that the lugs 46 are somewhat longer and are bent at right angles so that they may not be detached except by rotating the blades 41 downwardly approximately ninety degrees. Thus the lower ends of the blades 41 are hinged to the bracket and will not become detached while the beaters are in their operating position, but may be removed for cleaning or the like when the beaters are detached from the mixer motor or the motor is tilted to lift the beaters out of their working position.

At the point where the tops of the blades 41 contact the shaft 43, a pair of integral ears 47 are provided which transmit driving power to the blades 41. The upper ends 48 of the blades 41 are bent upwardly so as to extend parallel to the shaft 43 and are curved to have the same contour as the circumference of the shaft as shown in Fig. 12.

The upper portion of the cup-shaped collar 42 serves to hold the blade ends 48 in contact with the shaft 43 when the collar is in the position shown in Figs. 10 and 12, for the inside diameter of this part of the collar 42 is substantially the same as that of the shaft plus the thickness of the blade ends 48. When the ends of the blades are snug against the shaft, two of the blade ends 48 engage the ears 47 in drive relationship. The other two ends 48 lie adjacent the two which are driven by the ears and are driven thereby.

The lower part of the collar 42 is slightly larger in diameter than the upper portion and serves as a retainer to hold the blade ends 48 close to the shaft 43 when they have been unclutched on striking an object. In this embodiment the blades 41 are resilient, but they normally have the shape shown in Fig. 10, being essentially unstressed when supported on the beater shaft 42.

The action of the blades 41 upon striking an object is shown in Fig. 11. The blade 41a has been bent inwardly by striking an object and its upper end 48a has moved upwardly from its normal position, lifting the collar 42 a slight distance. As the collar 42 rises, the other three blades 41 remain in substantially the same position, but their upper ends 48 move outwardly into the larger diameter portion of the collar 42 due to centrifugal force. This outward movement disengages the blade ends 48 from the integral ears 47 on the shaft 43, allowing the blades 41 to come to rest while the shaft 43 continues to turn. Similarly the blade 41a which has been pressed inwardly has been disengaged from the ears 47, for its end 48a has been lifted above the ears. Thus the beater blades 41 come to rest, since the lower bracket 44 is journalled to the shaft 43 instead of being fixed thereto, and are not damaged when a foreign object is caught in the rotating beaters just as in the preferred embodiment. Once the collar has been lifted, the ends 48 of the blades bear against the shoulder formed between the upper and lower part of the collar to hold the collar in the raised position even if the blade 41a which lifted the collar is relaxed.

After disengagement of the blades 41 from the shaft 43 has been effected, the mixer may be turned off and the entangling object may be removed. The blades 41 are then moved inwardly, and the collar 42 is moved downwardly to again secure the blade ends 48 in driving contact with the lugs 47.

To disassemble the beater 40 for cleaning, the collar 42 is manually raised above the position shown in Fig. 11 to completely release the blade ends 48. The blades 41 may then be swung downwardly to a horizontal position so that the lugs 46 may be disconnected from the bracket 44.

The degree of cavitation may be adjusted in this embodiment just as in the preferred form by locating the lugs 46 in either of two positions in the bottom bracket 44 to vary the relative diameter of the blade elements 41. Since the bottom portions of the beaters accomplished most of the mixing, particularly when the mixing bowl is not completely full, considerable variation in mixing effect may be achieved even though the tops of the blades 41 are not adjustable.

The embodiment illustrated in Figs. 15 and 16 is quite similar to that just described except that the collar 42b is shorter and has no larger diameter portion. In this embodiment the blades 41b are released to fly outwardly from the shaft 43b when the collar 42b is lifted by one of the blades. The bracket arrangement for supporting the lower ends of the blades is identical with that of Fig. 14.

An undercut portion 50 is provided in the shaft 43b just above the normal position of the collar 42b. When an object is struck and one of the blades 41b is bent inwardly, its upper end 48b lifts the collar 42b to the position shown in Fig. 16, the undercut 50 catches the collar and holds it in the elevated position. The other blades 41b fly outwardly as shown, and the blade which has lifted the collar 42b is unclutched since its end portion is above the lugs 47b.

Consequently, it will be seen from the foregoing description of the embodiments disclosed and their operation how the objects set forth herein are accomplished, and although certain embodiments have been shown and described herein for purposes of disclosing the invention, it will be apparent to those skilled in the art that various and further modifications, changes and uses may be made without departing from the spirit and substance of the invention, the scope of which is commensurate with the following claims:

What is claimed is:

1. A beater for a food mixer comprising a shaft, a bracket at the bottom of said shaft having a plurality of radially extending blade supporting channels therein, a similar bracket spaced from the first on said shaft, each of said brackets having openings therein through the bottoms of the channels, a plurality of flexible blade elements supported on said brackets, the ends of said elements being received in said channels, and a lug on each end of each of said blade elements, said lugs projecting through said openings to secure the blades to the brackets.

2. A beater for a food mixer comprising a shaft, a bracket at the bottom of said shaft having a plurality of radially extending blade supporting channels therein, said channels facing downwardly, a similar bracket spaced from the first on said shaft and disposed with its channels facing upwardly, each of said brackets having openings in the bottom of the channels, a plurality of flexible blade elements supported on said brackets, the ends of said elements being received in said channels, and a lug on each end of each of said blade elements, said lugs on each blade projecting towards each other through said openings to secure the blades to the brackets.

3. A food mixer beater for use in a food mixer having interdigitating beaters comprising a shaft, means near one end of said shaft for rotating same, a bracket having radially extending arms supported on said shaft, each of said arms having an opening therethrough, a plurality of flexible blades, a projecting lug on the end of each of said blades, each of said lugs being removably received in one of said openings to secure the corresponding blade to the bracket, and flanges on the sides of each of said arms for holding said blades in fixed angular relationship to each other so that the blades of two of said beaters mounted for rotation in close proximity will interdigitate without interference.

4. A food mixer beater comprising a shaft, means near one end of said shaft for rotating same, a radially extending bracket supported on said shaft having a plurality of openings therethrough disposed at two different distances from the center of said shaft, a plurality of flexible blades, a projecting lug on the end of each of said blades, each of said lugs being removably received in one of said openings to secure the corresponding blade to the bracket, said openings being disposed at different distances from the shaft and providing means for ready adjustment of the effective mixing area of said beater.

5. In a food mixer beater a shaft, a pair of spaced brackets carried by the shaft, one of said brackets having blade receiving channels on the bottom face thereof and the other of said brackets having blade receiving channels in the upper face thereof, each of said channels in each of said brackets having radially spaced openings in the bottom thereof, four arcuate flexible blade elements having ends receivable in said channels, and lugs on the ends of each of the blade elements, each lug engaging one of the openings to lock the ends of the blades in the channels.

6. In a food mixer beater a shaft, a pair of cruciform brackets carried by the shaft, one of said brackets being disposed at the bottom of the shaft and having four channels on the bottom face thereof and the other of said brackets being disposed a distance above the bottom of said shaft, said last mentioned bracket having four channels in the upper face thereof, each of said channels in each of said brackets having two radially spaced openings in the bottom thereof, four arcuate flexible blade elements having ends receivable in said channels, and lugs on the ends of each of the blade elements, each lug engaging one of the openings to lock the ends of the blades in the channels.

7. In a food mixer beater a shaft, and a pair of cruciform brackets carried by the shaft, one of said brackets being disposed at the bottom of the shaft and having four channels on the bottom face thereof and the other of said brackets being disposed a distance above the bottom of said shaft, said last mentioned bracket having four channels in the upper face thereof, each of said channels in each of said brackets having two radially spaced openings in the bottom thereof.

8. In a food mixer, an agitator comprising a shaft, an element mounted thereon having radially disposed flanges defining channels, said channels having axially disposed openings therethrough, and blade elements having right angle lugs thereon adapted to be received in said openings, the sides of said channels holding said blades in a fixed position with respect to said elements.

9. In a food mixer beater the combination including a shaft, a plurality of arcuate flexible blades, a bracket having radial arms thereon disposed at the bottom of said shaft for releasably supporting one end of each of said blades, and means on said shaft spaced from said bracket for releasably supporting the upper ends of said blade elements in drive relationship, said means including a pair of radial ears on the shaft for engaging the upper ends of the blades and a slidable collar for holding the blade ends adjacent to the shaft.

10. In a food mixer beater the combination including a shaft, a plurality of arcuate flexible blades, a bracket journalled for free rotation on said shaft, said bracket having radial arms thereon disposed at the bottom of said shaft for releasably supporting one end of each of said blades, and means on said shaft spaced from said bracket for releasably supporting the upper ends of said blade elements in drive relationship.

11. In a food mixer beater the combination including a shaft, a plurality of arcuate flexible blades, a bracket having radial channels therein disposed at the bottom of said shaft for releasably supporting one end of each of said blades, and means on said shaft spaced from said bracket for releasably supporting the upper ends of said blade elements in drive relationship, said means comprising a pair of radial ears on the shaft for engaging the upper ends of the blades and a slidable collar for holding the blade ends adjacent to the shaft, and the bracket being journalled for free rotation with respect to said shaft.

12. A food mixer beater comprising a shaft, a plurality of arcuate flexible blade elements, a bracket disposed at the bottom of said shaft for releasably supporting one end of each of said blades, and means on said shaft spaced from said bracket for releasably supporting the upper ends of said blade elements in drive relationship, said means comprising a pair of radial ears on the shaft for engaging the upper ends of the blades and a slidable collar for holding the blade ends adjacent to the shaft.

13. A food mixer beater comprising a shaft, a plurality of arcuate flexible blade elements, a bracket journalled for free rotation and disposed at the bottom of said shaft for releasably supporting one end of each of said blades, and means on said shaft spaced from said bracket for releasably supporting the upper ends of said blade elements in drive relationship, said means comprising a pair of radial ears on the shaft for engaging the upper ends of the blades and a slidable collar for holding the blade ends adjacent to the shaft.

14. A rotary beater for a food mixer comprising a shaft, a plurality of spring blades having reenforcing ribs and being bent to a predetermined arcuate shape which is maintained under normal mixing operations, means at one end of said shaft for supporting the lower ends of the blades including a cruciform bracket having openings in each arm thereof for receiving projecting lugs on said blades, said arms having side elements for engaging the sides of the blades to hold same at right angles to each other, and means spaced upwardly on said shaft from said first mentioned means for supporting the upper ends of said blades in drive relationship, said last mentioned means being so constructed and arranged as to release the upper ends of the blades from drive relationship when the arcuate portion of said blades are forced inwardly to raise their upper ends.

15. A rotary beater for a food mixer comprising a shaft, a plurality of flexible arcuate blades, means at one end of said shaft for supporting the lower ends of said blades including a bracket having openings for receiving inwardly projecting lugs on said blades, said bracket having flange elements for engaging the sides of the blades to hold same at right angles to each other, and means spaced upwardly on said shaft from said first mentioned means for supporting the upper ends of said blades in drive relationship when said blades are pressed inwardly to deform their curvature and raise their upper ends from their normal resting position.

16. The combination of claim 15, the last mentioned means including an ear on said shaft and a collar for holding the upper end of one of said blades in contact with said ear.

17. The combination of claim 15, the last mentioned means including a bracket similar to the first mentioned bracket and said blades being engageable in openings in said bracket in drive relationship.

18. A food mixer beater comprising a shaft adapted to be rotatively driven, a plurality of arcuate beater blades disposed about said shaft at the lower end thereof, means for releasably attaching one end of each of said blades to said shaft including an element rotatable independently of said shaft to which the blade ends are attached, and means for releasably clutching the opposite ends of said blades to said shaft in driven relationship.

19. A plurality of interdigitating beaters for a food mixer in which each beater comprises a shaft, a bracket at the bottom of said shaft having a plurality of radially extending blade supporting channels therein, a similar bracket spaced from the first on said shaft, said brackets being mounted on the shaft with the channels of the respective brackets facing away from each other, and a plurality of spring blade elements supported on said brackets, the ends of said elements being received in said channels under tension in the elements urging opposite ends of each element towards each other.

20. In a food mixer beater a shaft, a pair of brackets carried by the shaft, one of said brackets being disposed at the bottom of the shaft and having a plurality of blade receiving channels on the bottom face thereof and the other of said brackets being disposed a distance above the bottom of said shaft, said last mentioned bracket having a plurality of blade receiving channels in the upper face thereof, each of said channels in each of said brackets having an opening in the bottom thereof, and a plurality of arcuate spring blade elements having end portions engageable in said channels for lateral support and ears on the end portions received in said openings for radial support of the blade elements, said engagement being maintained under tension in the elements which urges the ends of each element towards each other.

FRED C. SCHWANEKE.

REFERENCES CITED

The following references are of record in the file of this patent:

UNITED STATES PATENTS

| Number | Name | Date |
| --- | --- | --- |
| 1,738,112 | Myers | Dec. 3, 1929 |
| 2,054,666 | Van Guilder | Sept. 15, 1936 |
| 2,161,867 | Kessel | June 13, 1939 |
| 2,161,881 | Musolf | June 13, 1939 |
| 2,182,921 | Herter | Dec. 12, 1939 |
| 2,185,846 | Hacmac | Jan. 2, 1940 |